United States Patent
Satoh et al.

(10) Patent No.: US 7,336,887 B2
(45) Date of Patent: Feb. 26, 2008

(54) CONTENT PLAY BACK, INFORMATION PROCESSING, AND PLAY BACK RESTRICTION

(75) Inventors: Akashi Satoh, Yamato (JP); Koichi Kamijo, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 10/980,098

(22) Filed: Nov. 3, 2004

(65) Prior Publication Data
US 2005/0105884 A1    May 19, 2005

(30) Foreign Application Priority Data
Nov. 5, 2003    (JP)    ............... 2003-375846

(51) Int. Cl.
  *H04N 5/91*    (2006.01)
  *G11B 5/86*    (2006.01)
  *G11B 5/09*    (2006.01)
(52) U.S. Cl. ............... 386/94; 360/15; 360/60; 380/201; 369/47.12
(58) Field of Classification Search .............. 386/46, 386/94, 95; 360/15, 27, 60; 380/201; 369/47.12
See application file for complete search history.

(56) References Cited

U.S. PATENT DOCUMENTS

| | | | | |
|---|---|---|---|---|
| 5,574,787 A | * | 11/1996 | Ryan | ......................... 380/201 |
| 5,991,499 A | * | 11/1999 | Yagasaki et al. | .............. 386/94 |
| 6,266,299 B1 | * | 7/2001 | Oshima et al. | .......... 369/13.38 |
| 6,430,291 B1 | * | 8/2002 | Ogino et al. | ................. 380/203 |
| 6,712,118 B2 | * | 3/2004 | Nussdorf | .................... 160/351 |

OTHER PUBLICATIONS

Toru et al., Japanese Publication No. 2002-135243, published on May 10, 2002.

* cited by examiner

*Primary Examiner*—Thai Q. Tran
*Assistant Examiner*—Mishawn Dunn
(74) *Attorney, Agent, or Firm*—Lisa M. Yamonaco

(57) ABSTRACT

Provided is a content play back apparatus including: a play back means for playing content including audio or video; a play list managing means for managing a play list which is a list of identification information on content previously played by the play back means; a blacklist acquiring means for acquiring a blacklist which is a list of identification information on content illegally copied in the past; and a play back restricting means for restricting content play back of the play back means when any of identification information included in the play list is included in the blacklist.

27 Claims, 9 Drawing Sheets

Fig. 2

| IDENTIFICA-TION INFORMATION c | CONTENT DATA | | | TAMPER PREVENTION DATA |
|---|---|---|---|---|
| | CONTENT Ck | BLACKLIST Bc' [1:M] | | |
| | | REGISTRA-TION NUMBER | IDENTIFICATION INFORMATION | |
| 132456 ⋯ 123 | AUDIO, VIDEO OR GAME DATA | 1 | 145612 ⋯⋯ 132 | HASH VALUE |
| | | 2 | 163125 ⋯⋯ 421 | |
| | | 3 | 312543 ⋯⋯ 121 | |
| | | ⋮ | ⋮ | |
| | | M | 156234 ⋯⋯ 321 | |

Fig. 3

| ORDER OF PLAY BACK | IDENTIFICATION INFORMATION |
|---|---|
| 1 | 123345 · · · · 321 |
| 2 | 313226 · · · · 125 |
| 3 | 351213 · · · · 211 |
| · | · |
| · | · |
| · | · |
| · | · |
| N | 124532 · · · · 112 |

Fig. 5

| ORDER OF PLAY BACK | IDENTIFICATION INFORMATION | NUMBER OF PLAY BACK | RESULT OF DETERMINATION OF PIRATED COPY | DATE AND TIME OF INITIAL PLAY BACK (YEAR/MONTH/DAY/TIME) |
|---|---|---|---|---|
| 1 | 123345 ······ 321 | 41 | UNIDENTIFIED | X/Y/Z W |
| 2 | 313226 ······ 125 | 23 | UNIDENTIFIED | A/B/C D |
| 3 | 351213 ······ 211 | 45 | PIRATED COPY | E/F/G H |
| ⋮ | ⋮ | ⋮ | ⋮ | ⋮ |
| N | 124532 ······ 112 | 7 | UNIDENTIFIED | I/J/K L |

110

Fig. 8
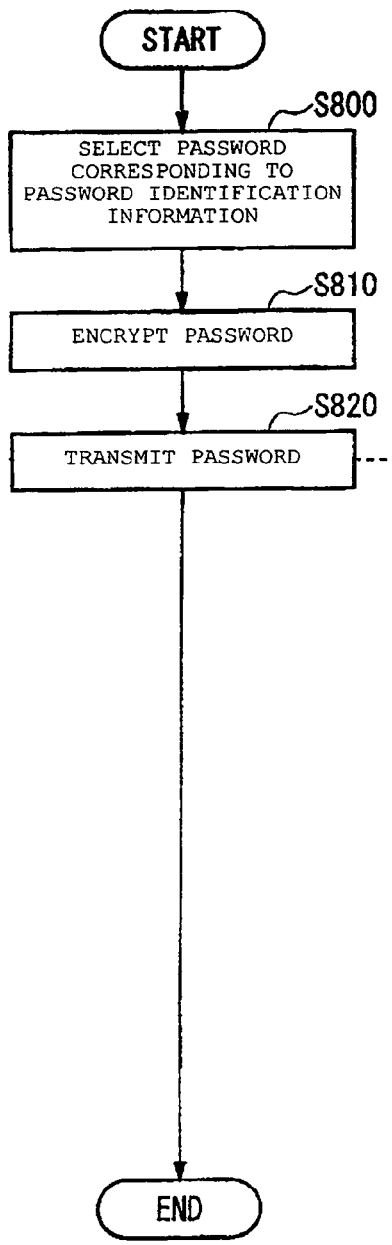
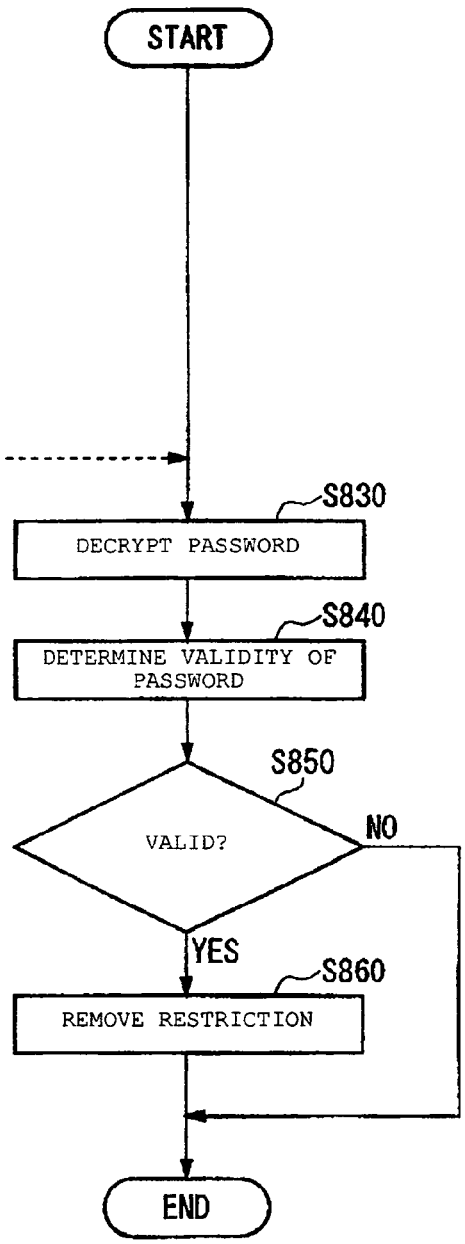

CONTENT PLAY BACK, INFORMATION PROCESSING, AND PLAY BACK RESTRICTION

FIELD OF THE INVENTION

The invention relates to a content play back apparatus, a play back restricting method, information processing system, a content play back program, and a recording medium, which restrict play back of content including audio or video. More particularly, the invention relates to a content play back apparatus, a play back restricting method, information processing system, a content play back program, and a recording medium, which restrict play back of content based on information on content illegally copied in the past.

BACKGROUND OF THE INVENTION

Recently, content such as music, video or games has been recorded as digital data on media such as CDs, and those media have been widely sold. Digital data undergoes no or little degradation in image quality or the like, and those media in themselves are cheap. Thus, the sale of illegal copies of such content has become a problem.

There has been heretofore proposed a technique which involves prestoring a list of identification information on illegally copied content, and determining whether or not identification information on newly played content is included in the list. See Japanese Unexamined Patent Application Publication No. 2002-135243. According to the technique, a play back apparatus stores the list and adds to the stored list identification information acquired from outside. Thus, the technique enables appropriate restriction upon play back of even illegal copies detected after the manufacture of the play back apparatus.

However, effective prevention of play back of illegally copied content requires that a content play back apparatus should store therein a large amount of identification information on illegally copied content. Thus, the play back apparatus must include a storage device to store the identification information, and this results in a problem of raising the cost to manufacture the play back apparatus.

At the time when a content distributor or the like identifies identification information on illegally copied content, the content may be already out of date. In this case, a problem exists: even restriction of play back of the content has little effect of alerting wicked users because users no longer use the content.

SUMMARY OF THE INVENTION

It is therefore an aspect of the invention to provide a content play back apparatus, a play back restricting method, an information processing system, a content play back program, and a recording medium, which are capable of solving the foregoing problems. This aspect is achieved by combinations of features as set forth in independent claims of the appended claims. Dependent claims thereof define further advantageous specific examples of the invention.

In order to solve the foregoing problems, there are provided, in an example embodiment of the invention, a content play back apparatus which includes a play back means for playing content including audio and/or video, a playlist managing means for managing a playlist which is a list of identification information on content played by the play back means in the past, a blacklist acquiring means for acquiring a blacklist which is a list of identification information on content copied illegally in the past, and a play back restricting means for restricting play back of content by the play back means when any of identification information included in the playlist is included in the blacklist, a play back restricting method using a content play back apparatus, an information play back system including a content play back apparatus, a content play back program in which a computer is operated as a content play back apparatus, and a recording media in which a content play back program is recorded.

Incidentally, the above summary of the invention does not give all necessary features of the invention, and therefore, subcombinations of these features may be also embraced by the invention.

BRIEF DESCRIPTION OF THE DRAWINGS

For a more complete understanding of the present invention and the advantage thereof, reference is now made to the following description taken in conjunction with the accompanying drawings, in which:

FIG. 2 shows an example of a data structure of data stored in a recording medium 20 (the first embodiment of the invention);

FIG. 3 shows an example of a playlist managed by a playlist managing means 110 (the first embodiment of the invention);

FIG. 5 shows an example of the playlist managed by the playlist managing means 110 according to a modification;

FIG. 8 shows a process for removing restriction upon play back, which is performed by the content play back apparatus 10-1 (the second embodiment)

DETAILED DESCRIPTION OF THE INVENTION

The present invention provides content play back apparatus, play back restricting methods, information processing systems, content play back programs, and a recording media, capable of solving the foregoing problems. In an example embodiment of the invention, a content play back apparatus includes: a play back means for playing content including audio and/or video; a playlist managing means for managing a playlist which is a list of identification information on content played by the play back means in the past; a blacklist acquiring means for acquiring a blacklist which is a list of identification information on content copied illegally in the past; and a play back restricting means for restricting play back of content by the play back means when any of identification information included in the playlist is included in the blacklist; a play back restricting method using a content play back apparatus, an information play back system including a content play back apparatus; a content play back program in which a computer is operated as a content play back apparatus, and a recording media in which a content play back program is recorded. Sub-combinations of these features are also embraced by the invention.

Although the invention will be described below according to particular embodiments of the invention, it is to be understood that the following embodiments do not limit the invention as claimed in the appended claims, and that all combinations of features as described in the embodiments are not necessarily essential for means of the invention for solving the problems.

First Embodiment

Figure 1:
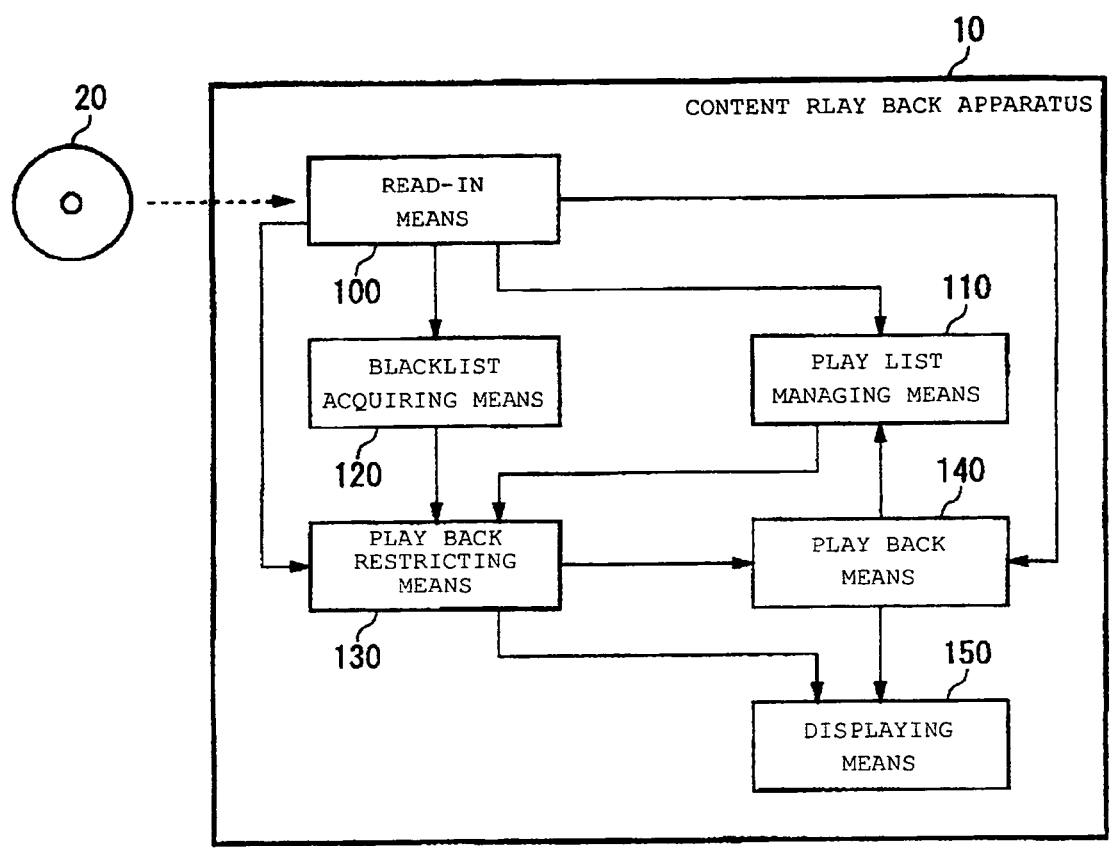
FIG. 1 is a block diagram of a content play back apparatus 10 (a first embodiment of the invention)

FIG. 1 shows a block diagram of a content play back apparatus 10. The content play back apparatus 10 reads out and plays content including audio and/or video from a recording medium 20. The content play back apparatus 10, which is also an example of a program executing apparatus according to the invention, reads out programs, which perform various types of processing, from the recording medium 20, and executes those programs. In this case, the content play back apparatus 10 performs a function of restricting subsequent content play back or program execution when any of previously played content or executed programs is content or a program illegally copied in the past (hereinafter referred to simply as a "pirated copy"). A legitimate content manufacturer or the like (hereinafter referred to simply as an "administrator") pre-informs users of the above-mentioned function, and thereby the administrator can prevent users from playing pirated copies, thus preventing illegal copying.

As mentioned above, the content play back apparatus 10 not only plays content but also executes programs. In some embodiments, the content play back apparatus 10 includes a read-in means 100, a playlist managing means 110, a blacklist acquiring means 120, and a play back restricting means 130, a play back means 140, and a displaying means 150. The recording medium 20 is an optical recording medium such as a CD-ROM or a DVD-ROM, a ROM cartridge, or the like, and has content data or program data recorded thereon. When the recording medium 20 is inserted into the content play back apparatus 10, the read-in means 100 reads in from the recording medium 20 content or a program, identification information on the content or program, a blacklist, and tamper prevention data.

The playlist managing means 110 manages a playlist which is a list of identification information on content played or programs executed in the past by the play back means 140. When the play back means 140 plays content or executes a program, the playlist managing means 110 then adds to the playlist identification information on the content or the program, which is read in by the read-in means 100. The blacklist acquiring means 120 acquires a blacklist read in by the read-in means 100. When any of identification information included in the playlist is included in the blacklist, the play back restricting means 130 then restricts content play back or program execution of the play back means 140.

Specifically, for the play back means 140 to play content or execute a program, the play back restricting means 130 determines whether or not any of identification information included in the playlist is included in the blacklist read in together with the content or the program. When any of identification information is included in the blacklist, the play back restricting means 130 inhibits only play back of the content or execution of the program. In this case, the play back restricting means 130 may permit play back of other content or execution of other programs.

A method of restricting content play back or program execution is not limited to the above-mentioned method. For example, the play back restricting means 130 may restrict a process for updating software that allows the content play back apparatus 10 to operate, when any of the identification information included in the playlist is included in the blacklist. When the software serves to enhance the functions of the content play back apparatus 10, this method disables users, who use pirated copies, from enhancing the functions, and thus makes it impossible for the users to play new content supporting the functions or execute a new program supporting the functions.

The play back restricting means 130 may restrict some functions of the software rather than all functions thereof. For example, the play back restricting means 130 can permit only legitimate users, who have not used pirated copies, to perform additional functions of enhancing the functions of the content play back apparatus 10, while permitting all users to perform functions of correcting extremely fatal bugs.

The play back restricting means 130 may use tamper prevention data, which is read in by the read-in means 100, to see if a set of content or a program and a blacklist is different from the set thereof acquired at the time of manufacture of the recording medium 20. When the set of the content or program and the blacklist is different from the set thereof acquired at the time of manufacture of the recording medium 20, the play back restricting means 130 inhibits the play back means 140 from playing the content or executing the program.

Only when the play back restricting means 130 permits play back or execution, the play back means 140 plays or executes content or a program which is recorded on the recording medium 20 and read in by the read-in means 100. For example, when content or a program includes video, the play back means 140 may use the displaying means 150 to display the video. The play back means 140 is also an example of an executing means according to the invention. Thus, for embodiment, the play back means 140 may execute a program to perform other processing without playing any video and/or audio.

When any of identification information included in the playlist is included in the blacklist, the displaying means 150 shows users a warning message stating that the content play back apparatus 10 has played a pirated copy. Further, the displaying means 150 may emit a warning beep as well as display the warning message.

It is desirable that the playlist managing means 110, the blacklist acquiring means 120, the play back restricting means 130, and the play back means 140 are implemented in a central processing unit of the content play back apparatus 10. In this case, it is difficult for a user to change the functions of the content play back apparatus 10 even when the user causes a break or short-circuit in a connection of an LSI or the like within the content play back apparatus 10. This configuration can prevent users from illegally disabling restriction of content play back or program execution.

As described above and shown in FIG. 1, the content play back apparatus 10 stores all identification information on previously played content or previously executed programs, and compares the identification information to a list of identification information on pirated copies, which is read out from the recording medium 20. Thus, the content play back apparatus 10 can restrict subsequent content play back or program execution when any of the previously played content items or any of the previously executed programs is a pirated copy.

In this embodiment, the content play back apparatus 10 does not require communications with an external apparatus, e.g., an administrating server which manages copyright or the like. Thus, the content play back apparatus 10 can effectively prevent play back of pirated copies even when the apparatus 10 is used in areas whose communications facilities are insufficient.

FIG. 2 shows an example of a data structure of data stored in the recording medium 20. The recording medium 20 has content or program identification information, content data, and tamper prevention data, which are recorded thereon. The content or program identification information is information unique to each of legitimately copied content or programs. More specifically, each time an administrator copies content or a program, the administrator associates a different numeric value serving as identification information with the content or program, and records the numeric value on the recording medium 20.

It is advantageous that a numeric value indicative of the identification information has the number of digits capable of representing a much larger number than the number of legitimately copied content or programs. The administrator selects inconsecutive values as effective identification information among values which can be represented by the number of digits, and associates those selected values with the content or programs. It is more advantageous that differences between the numeric values selected as the identification information are not smaller than a predetermined value. In other words, numeric values to be used as effective identification information are selected so that those numeric values are randomly distributed within the range of values which can be represented by the number of digits. This makes it difficult to forge the identification information. Incidentally, the identification information is hereinafter indicated by c.

The content data includes content associated with a blacklist. The content is data to play audio, video, computer games, or the like. Hereinafter, the content is indicated by Ck. The content data may include a program to perform other processing without playing any audio or video. Hereinafter, a case in which the content play back apparatus 10 does not include any program but includes only content will be described as a representative example.

The content may be encrypted using a cipher whose decipher key is stored in the content play back apparatus 10. In this case, it is desirable that any of conventional content play back apparatuses not having the function of restricting play back as described in this embodiment be incapable of decrypting the cipher. Thus, the content play back apparatus 10 can realize the function of restricting play back while maintaining upward compatibility with conventional content play back apparatus.

The blacklist is a list of identification information on pirated copies which have been already found out at the time of manufacture of the content. Each of content manufacturers can freely set identification information on pirated copies which each manufacturer does not want to distribute, at the convenience of each manufacturer. In FIG. 2, the blacklist includes M pieces of pirated copy identification information. It is advantageous that the blacklist is encrypted using a cipher whose decipher key is possessed by the content play back apparatus 10. An example of the blacklist is as follows: the blacklist is encrypted using a secret key (Ks) of a public key cryptosystem, and the content play back apparatus 10 has a public key (Kp) of the public key cryptosystem. It is desirable that the secret key (Ks) is managed by only the manufacturer who legitimately manufactures the content. This can prevent leakage of the secret key (Ks), even when wicked users disassemble and analyze the content play back apparatus 10. Hereinafter, the blacklist is expressed as Bc[1:M], and the encrypted blacklist is expressed as Bc'[1:M].

The tamper prevention data is, for example, data including a hash value which is generated from the content and the blacklist, which are associated with each other, by using a predetermined hash function H. The tamper prevention data can be used to see if a set of the content and the blacklist is different from the set thereof acquired at the time of manufacture. Specifically, the tamper prevention data can be used to detect fraudulent acts, such as replacement of the blacklist of the content with a blacklist of other content by a wicked user. Hereinafter, the hash value is expressed as H(Ck|Bc'[1:M]), where the symbol "|" denotes data concatenation.

The tamper prevention data may be encrypted using the secret key (Ks). In this embodiment, data in which the hash value H(Ck|Bc'[1:M]) and the content identification information c are associated with each other may be encrypted. In this case, the tamper prevention data x is expressed as E(Ks,c|H(Ck|Bc'[1:M])), where a symbol "E( )" denotes an encryption function using a secret key (Ks) of a public key cryptosystem. The tamper prevention data may be configured so that the data excluding the identification information c, that is, only the hash value is encrypted using the secret key (Ks). In this case, each time the administrator copies the recording medium 20, the administrator can omit a process for generating the tamper prevention data x to efficiently copy the recording medium 20. The tamper prevention data may be generated based on the hash value for part of the content Ck rather than all the content Ck. This allows speeding up generation of the tamper prevention data.

As described above and shown in FIG. 2, the recording medium 20 stores the content identification information, the content, the blacklist, and the tamper prevention data, which are associated with one another. A specific example of storage is as follows: the recording medium 20 may record such information in a read only area thereof. Alternatively, the following approach may be adopted for the purpose of making forgery more difficult: the recording medium 20 records the content, and the blacklist which is embedded in the form of an electronic watermark in the content so that the blacklist is associated with the content, and the blacklist acquiring means 120 acquires the blacklist from the electronic watermark.

FIG. 3 shows an example of the playlist managed by the playlist managing means 110. The playlist managing means 110 manages the playlist which is a list of identification information on content played in the past by the play back means 140. It is advantageous that the playlist managing means 110 manages the playlist stored in a nonvolatile memory or storage within the content play back apparatus 10, such as a flash memory or an FeRAM. It is more advantageous that the playlist managing means 110 manages the playlist stored in a memory or storage within an LSI for use in an arithmetic operation, rather than a single memory module, in order to make the playlist resistant to tampering. Hereinafter, the playlist is expressed as A[1:N].

Figure 4:
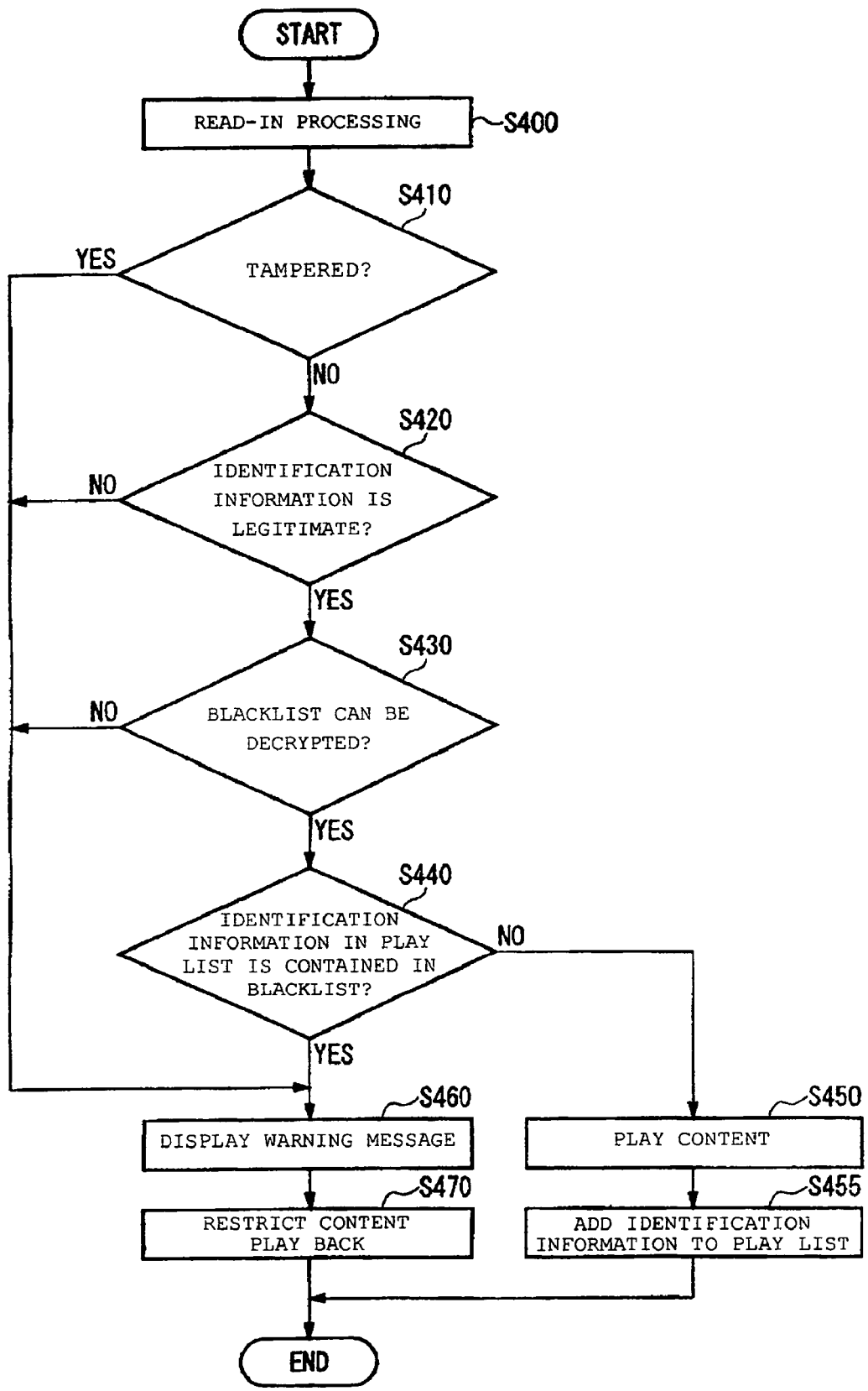
FIG. 4 shows a process for playing content, which is performed by the content play back apparatus 10 (the first embodiment)

FIG. 4 shows a process for playing content, which is performed by the content play back apparatus 10. For example, the content play back apparatus 10 performs the following processing each time the recording medium 20 is inserted into the content play back apparatus 10. The read-in means 100 reads in from the recording medium 20 content, content identification information, a blacklist, and tamper prevention data (S400). Then, the blacklist acquiring means 120 acquires the blacklist read in by the read-in means 100.

By using the tamper prevention data read in by the read-in means 100, the play back restricting means 130 determines whether or not a set of the content and the blacklist is tampered with as compared to the set thereof acquired at the time of manufacture of the recording medium 20 (S410). Specifically, the play back restricting means 130 first generates a hash value from the content and the blacklist read in by the read-in means 100 by using the hash function H. When the generated hash value is different from the tamper prevention data read in by the read-in means 100, the play back restricting means 130 then determines that the set of the content and the blacklist is tampered with.

When the set of the content and the blacklist is tampered with, that is, when the hash value, which is obtained from: the content and the blacklist read in by the read-in means 100 by using the hash function H, is different from the tamper prevention data (YES in S410), the play back restricting means 130 then shifts the processing to S460 in order to restrict play back of the content.

Considering encryption of the hash value, the above-described processing is expressed by the following equation (1):

$$\text{if } (D(Kp,x)!=c|H(Ck|Bc'[1:M]))\text{revoke;} \quad \text{equation (1)}$$

where "revoke" indicates a process for restricting content play back, which is performed by the play back means 140, and a symbol "D( )" denotes a process for decrypting a public key cryptograph by using a public key "Kp".

When the blacklist is not tampered with (NO in S410), the play back restricting means 130 acquires the content identification information from the recording medium 20 and determines whether or not the acquired identification information is identification information assigned to legitimately copied content (S420). When the acquired identification information is not legitimate identification information (NO in S420), the processing then goes to S460 in order to restrict play back of the content.

Furthermore, the play back restricting means 130 converts the legitimate identification information into other numeric values. Specifically, the play back restricting means 130 converts a plurality of different legitimate identification information items into a plurality of different positive numbers. In other words, the play back restricting means 130 performs such conversion so as to provide a one-to-one mapping between the identification information before the conversion and the values after the conversion.

The above-described processing performed by the play back restricting means 130 is expressed by the following function F. More specifically, the function F converts a plurality of different legitimate identification information items into a plurality of different positive numbers and converts illegitimate identification information items into negative numbers.

Properties of the function F regarding legitimate identification information items i and j are expressed by the following equation (2). The processing of S420 performed by the play back restricting means 130 is expressed by the following equation (3).

$$i,j => F(i), F(j) \quad \text{equation (2)}$$

$$id=F(c); \text{ if}(id<0)\text{revoke;} \quad \text{equation (3)}$$

It is desirable that the administrator alone knows an algorithm of conversion using the function F and the administrator keeps the algorithm secret from users.

A method of determining whether or not identification information is legitimate (that is, specific implementation of the function F) can be implemented by using known techniques, but the following approach may be implemented as an example. For instance, identification information has a parity bit. Thus, the play back restricting means 130 may compare the parity of data of the identification information, excluding the parity bit, to the parity bit and determine that the identification information is not legitimate when the parity is different from the parity bit. When the identification information is legitimate, the play back restricting means 130 outputs the data excluding the parity bit, as the converted value. When the identification information is not legitimate, the play back restricting means 130 may output a predetermined negative value.

When the identification information read out from the recording medium 20 is the identification information assigned to the legitimately copied content (YES in S420), the blacklist acquiring means 120 tries decrypting the blacklist by using a prestored decipher key, e.g., a public key (Kp) of a public key cryptosystem (S430). When the blacklist acquiring means 120 fails to decrypt the blacklist (NO in S430), the processing goes to S460 in order to restrict content play back of the play back means 140. This can restrict play back of the recording medium 20 having the illegitimately generated blacklist.

This processing is expressed by the following equation (4).

$$Bc[1:M]=D(Kp,Bc'[1:M]); \quad \text{equation (4)}$$

The following processing may be performed to prepare for situations where the secret key to encrypt the blacklist is leaked out to users and so on. The blacklist is encrypted using any of a plurality of predefined ciphers. The content play back apparatus 10 has public keys corresponding to each of the plurality of ciphers. The blacklist acquiring means 120 tries decrypting the blacklist by using those public keys corresponding to each of the plurality of ciphers. When the blacklist acquiring means 120 succeeds in decrypting the blacklist by using any of the public keys, the blacklist acquiring means 120 determines that the blacklist has been decrypted. This allows the administrator to appropriately encrypt the blacklist, even when one of secret keys is leaked out to a user and so on.

Moreover, the blacklist acquiring means 120 disables one of the stored public keys, based on control information recorded on the recording medium 20. By recording on the recording medium 20 control information to disable the public key corresponding to the leaked secret key, the administrator can prevent users from illicitly encrypting the blacklist by using the leaked secret key. Furthermore, the blacklist acquiring means 120 may have a means for updating the prestored public keys, based on control information recorded on the recording medium 20. This enables preventing a shortage of public keys even when a number of secret keys are leaked out. It is desirable that the control information recorded on the recording medium 20 is encrypted using a secret key for a cipher which is not leaked to users and so forth.

When the blacklist acquiring means 120 succeeds in decrypting the blacklist (YES in S430), the play back restricting means 130 determines whether or not any of the identification information included in the playlist is included in the blacklist (S440). When any of the identification information is not included in the blacklist, the play back means 140 plays the content (S450).

This processing is expressed by the following equation (5).

$$\text{If}(A[i]==Bc[j])\text{for some }(i,j)(1<=i<=N,1<=j<=M),\\ \text{revoke;} \quad\quad\quad\quad \text{equation (5)}$$

Then, the playlist managing means 110 adds the identification information on the played content to the playlist (S455). Alternatively, the playlist managing means 110 may add to the playlist the converted identification information expressed as the function F of the play back restricting means 130. In this case, it is desirable that the identification information included in the blacklist is also in the form of converted identification information thereof. This can make it more difficult to forge the playlist and the blacklist.

When any of the identification information included in the playlist is included in the blacklist (YES in S440), the displaying means 150 shows a user a warning message stating that the content play back apparatus 10 has played a pirated copy, and thus the displaying means 150 gives the message to users (S460). The displaying means 150 may further show a user identification information on pirated copy and provide the information to users.

Then, the play back restricting means 130 restricts content play back of the play back means 140 (S470). Specific examples of content restriction are as follows: the play back restricting means 130 may inhibit the play back means 140 from playing all content, or inhibit the play back means 140 from playing only content acquired together with the blacklist including the identification information. Furthermore, after the displaying means 150 displays a warning message, the play back restricting means 130 may inhibit the play back means 140 from playing all content when the pirated copy is again played.

Alternatively, the play back means 140 may take more boot time to boot the content play back apparatus 10 when any of identification information included in the playlist is included in the blacklist than when none of identification information included in the playlist is included in the blacklist. As employed herein, "boot time" refers to, for example, the time required for the play back means 140 to reach a ready state for content play back after the power-on of the content play back apparatus 10. As mentioned above, the play back restricting means 130 may reduce the convenience of the content play back apparatus 10 which has played pirated copies so as to restrict content play back of the play back means 140.

The order of processing shown in FIG. 4 is illustrative only, and thus the order may be partially changed. Specifically, when the play back means 140 plays content (S450), the playlist managing means 110 adds the identification information on the played content to the playlist (S455). Alternatively, when the read-in means 100 reads out content (S400), the playlist managing means 110 may add the identification information on the read content to the playlist. Thus, even when users try to play a pirated copy but fail to play the pirated copy, the playlist managing means 110 can add the identification information on the pirated copy to the playlist.

As described above and shown in FIGS. 1 to 4, the content play back apparatus 10 restricts subsequent content play back when any of previously played content is a pirated copy. Thus, the content play back apparatus 10 can prevent users from playing pirated copies and thus prevent illegal copying. Furthermore, the content play back apparatus 10 can check if identification information is legitimate, use a public key cryptograph, and check if tampering is performed, thereby making it difficult for users to illegally copy the recording medium 20.

Moreover, these functions can be implemented at low manufacturing costs. Specifically, the content play back apparatus 10 needs to include a memory or storage for storing a playlist, and the recording medium 20 needs to record a blacklist. Thus, it is expected that manufacturing costs will be increased. However, the number of identification information items included in the playlist hardly exceeds 100, although the number varies depending on how users use the apparatus. Therefore, the content play back apparatus 10 can have a memory or storage having a relatively small storage area, which is sufficient to store the playlist.

On the other hand, content manufacturers may want the blacklist to include a vast number of identification information items in light of the current situation in which illegal copying frequently occurs. However, the recording medium 20 often has an empty area left therein, even when the recording medium 20 has content recorded thereon. In this case, the cost to record the blacklist in the empty area is very low. Thus, the content play back apparatus 10 can effectively prevent distribution of pirated copies and the like at low manufacturing costs.

FIG. 5 shows an example of the playlist managed by the playlist managing means 110 according to a modification. In the modification, the playlist managing means 110 manages identification information of content previously played by the play back means 140, the number of times of play back of each content, the results of determination as to whether or not each content is a pirated copy, and the date and time of initial play back of each content, which are associated with one another.

With reference to FIG. 5, a description will be given with regard to a modification of the process for restricting content play back, which is performed by the play back restricting means 130. In the modification, when any of identification information included in the playlist is included in the blacklist, the play back restricting means 130 makes the playlist managing means 110 manage information indicating that the content having such identification information is a pirated copy, in a manner that such identification information and the identification information included in the blacklist are associated with each other. For example, content corresponding to the order of play back "3" is determined as a pirated copy by the play back restricting means 130.

The play back restricting means 130 restricts play back of the content determined as the pirated copy. More specifically, the play back restricting means 130 inhibits play back of the content whose identification information is included in the blacklist and which has been previously played by the play back means 140. Thus, the play back restricting means 130 can inhibit only further play back of previously played pirated copies, while permitting play back of legitimate content and thus maintaining for the convenience of users.

When a pirated copy is played by the play back means 140 at more times than predetermined, the play back restricting means 130 may restrict play back of the play back means 140. Since the content corresponding to the order of play back "3", for example, is a pirated copy and has been previously played more times than predetermined, e.g., 30 times, the play back restricting means 130 inhibits play back of the pirated copy. When the pirated copy is played still more times, the play back restricting means 130 determines that the content play back apparatus 10 is being used by a wicked user, and may inhibit the play back means 140 from playing all content.

The play back restricting means 130 may perform the following processing in order to effectively restrict only play back of new pirated copies. When the play back restricting means 130 determines that any of identification information included in the playlist is identification information on a pirated copy, the play back restricting means 130 acquires the date and time of initial play back of the pirated copy from the playlist managing means 110. Then, the play back restricting means 130 selects content, which has not passed a predetermined reference time period after the date and time of initial play back thereof, among pirated copies. The play back restricting means 130 restricts play back of the selected content and permits play back of content which has passed the reference time period. Thus, the play back restricting means 130 may restrict play back of pirated copies of content, which may have been illegally copied immediately after the release of the content, so as to effectively prevent only malicious illegal copying.

As described above, the content play back apparatus 10 can use the above-mentioned various methods to restrict content play back. The content play back apparatus 10 may further have a function of selecting among the methods for restricting content play back. With this function, the administrator can select the restricting method suitable for his or her own purpose and set the selected method in the content play back apparatus 10.

Second Embodiment

Figure 6:
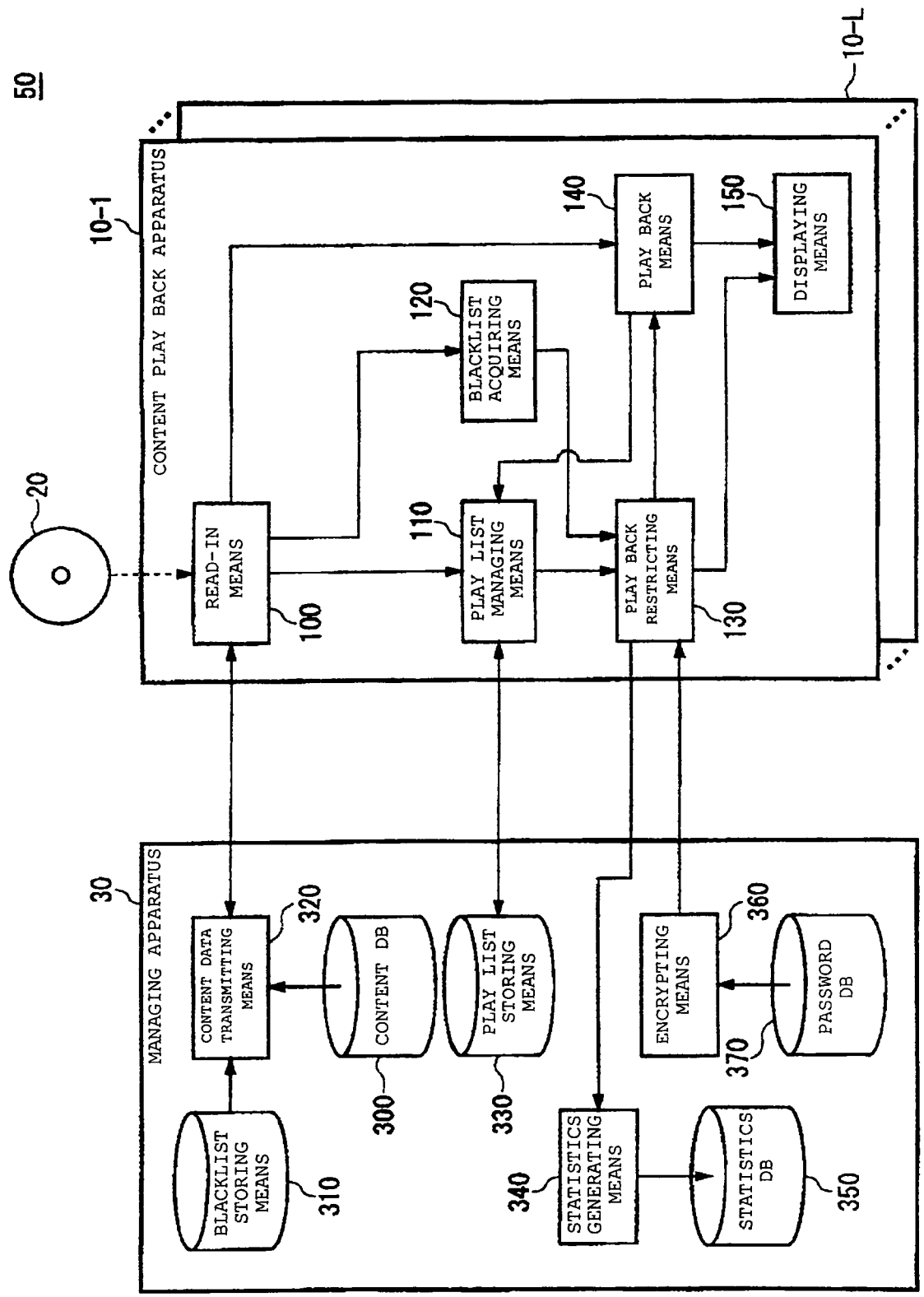
FIG. 6 is a block diagram of an information processing system 50 (a second embodiment of the invention)

FIG. 6 shows a block diagram of an information processing system 50. The information processing system 50 includes content play back apparatuses 10-1 to 10-L, each of which plays content, and a managing apparatus 30 which manages information on illegally copied content. The managing apparatus 30 is managed by an administrator who is a content manufacturer or the like. The managing apparatus 30 includes a content DB 300, a blacklist storing means 310, a content data transmitting means 320, a playlist storing means 330, a statistics generating means 340, a statistics DB 350, an encrypting means 360, and a password DB 370. The content DB 300 has content stored therein. The blacklist storing means 310 has a blacklist stored therein.

Upon receipt of a request for content data from the read-in means 100, the content data transmitting means 320 acquires the requested content from the content DB 300 and acquires a blacklist from the blacklist storing means 310. Then, the content data transmitting means 320 transmits the content data including the acquired content and blacklist to the read-in means 100. For example, the content data transmitting means 320 may transmit to the read-in means 100 one file into which the content and the blacklist are combined.

The playlist storing means 330 stores therein the respective playlists of the content play back apparatuses 10-1 to 10-L, in a manner that each of playlists is associated with information which identifies each of the apparatuses 10-1 to 10-L. When the play back restricting means 130 restricts content play back, the statistics generating means 340 acquires from the play back restricting means 130 identification information on content determined as a pirated copy by the play back restricting means 130, information indicating the date and time of play back of the content, and information indicating areas in which play back has taken place. Then, the statistics generating means 340 generates statistics of identification information on the pirated copy, the information indicating the date and time of play back of the pirated copy, and the information indicating the areas in which play back has taken place, and stores such statistics in a statistics DB 350. Thus, the administrator can know the tendency of distribution and sale of pirated copies which have been played by the content play back apparatuses 10-1 to 10-L.

Upon receipt of a command from a user of the managing apparatus 30, the encrypting means 360 acquires from the password DB 370 a password to remove restriction upon content play back, which is imposed by the play back restricting means 130. Then, the encrypting means 360 encrypts the password by using a secret key of the public key cryptosystem, and transmits the encrypted password to the content play back apparatus 10-1.

Since the content play back apparatus 10-1 is about the same as the content play back apparatus 10 shown in FIG. 1, a description will be given with regard to the differences between the apparatuses 10-1 and 10. Since each of the content play back apparatuses 10-2 to 10-L are about the same as the content play back apparatus 10-1, a description thereof will be omitted. The content play back apparatus 10-1 includes the read-in means 100, the playlist managing means 110, the blacklist acquiring means 120, the play back restricting means 130, the play back means 140, and the displaying means 150.

The read-in means 100 not only reads in content, content identification information, a blacklist, and tamper prevention data from the recording medium 20, but also receives them from the managing apparatus 30 via a network. The read-in means 100 may read in content, content identification information, a blacklist, and tamper prevention data from a server other than the managing apparatus 30 via a network. The playlist managing means 110 manages the playlist by sequentially adding identification information of content played by the play back means 140 to the playlist storing means 330 of the managing apparatus 30.

The play back restricting means 130 further performs the following processing in addition to the processing described in FIG. 1. The play back restricting means 130 outputs to the statistics generating means 340 of the managing apparatus 30 identification information which identifies content that has been illegally copied in the past and played by the play back means 140, in a manner that the identification information is associated with information indicating the date and time of play back of the content or information indicating areas in which the content has been played.

When content play back of the content play back means 140 is restricted by the play back restricting means 130, the play back restricting means 130 removes restriction upon content play back of the play back means 140, upon receipt of a password from the encrypting means 360 of the managing apparatus 30. Specifically, the play back restricting means 130 decrypts the password received from the encrypting means 360 by using a public key (Kp) corresponding to a secret key (Ks). When the decrypted password is valid, the play back restricting means 130 removes restriction upon content play back.

Figure 7:
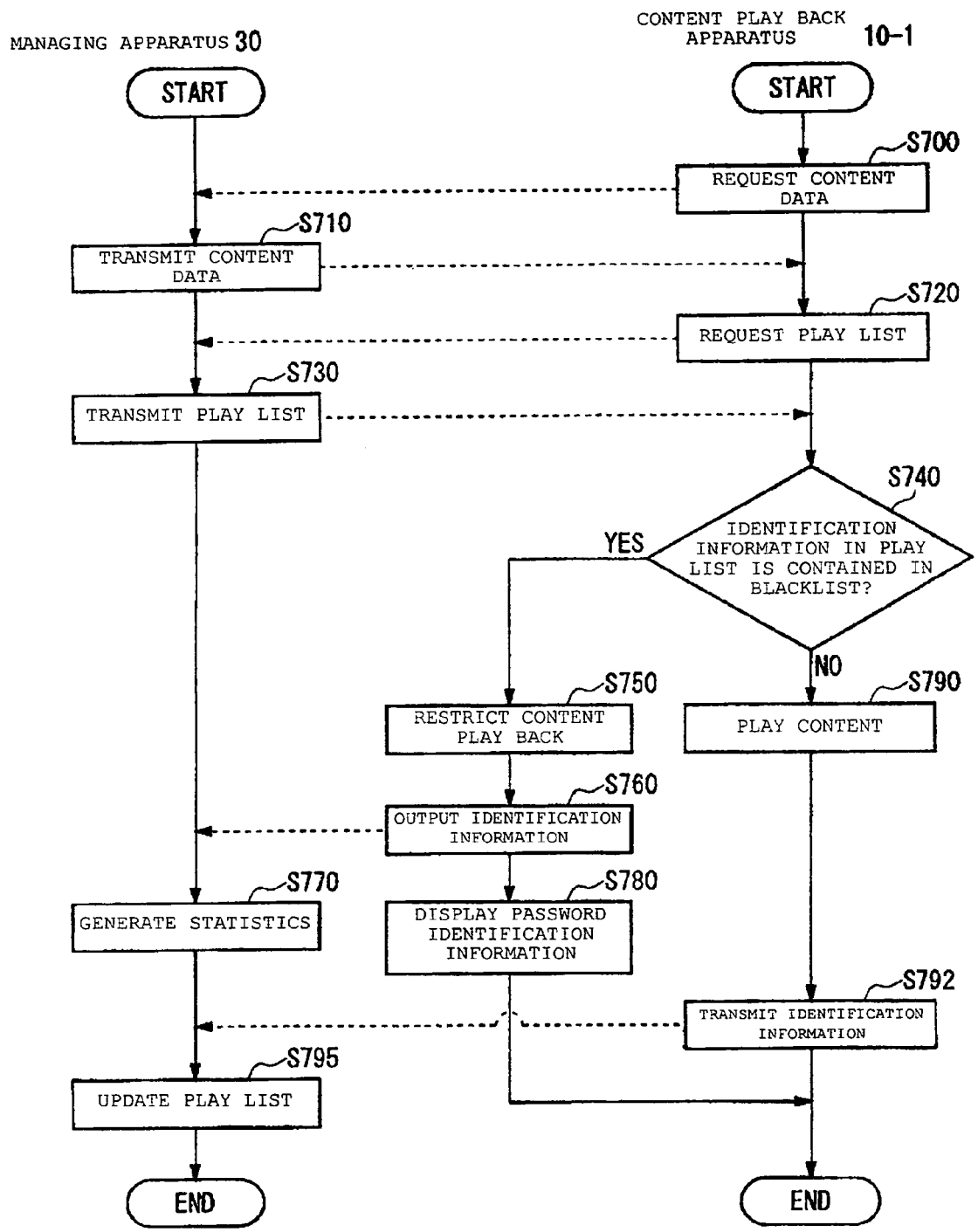
FIG. 7 shows a process for playing content, which is performed by a content play back apparatus 10-1 (the second embodiment)

FIG. 7 shows a process for playing content, which is performed by the content play back apparatus 10-1. The read-in means 100 sends a request for content data to the managing apparatus 30 (S700). Upon receipt of this request, the content data transmitting means 320 transmits the content data to the content play back apparatus 10-1 (S710). The playlist managing means 110 sends a request for a playlist to the managing apparatus 30 (S720). Upon receipt of this request, the playlist storing means 330 transmits the playlist to the content play back apparatus 10-1 (S730).

The play back restricting means 130 determines whether or not any of identification information included in the playlist is included in a blacklist of the content data (S740). When any of the identification information is included in the blacklist (YES in S740), the play back restricting means 130 restricts content play back (S750). Then, the play back restricting means 130 outputs to the statistics generating means 340 identification information which identifies content that has been illegally copied in the past and played by the play back means 140, in a manner that the identification information is associated with information indicating the date and time of play back of the content or information indicating areas in which the content has been played (S760).

Incidentally, the play back restricting means 130 may determine the address of a user, which has been previously registered with the administrator by the user of the content play back apparatus 10-1, as an area in which the content has been played. Moreover, the play back restricting means 130 may determine the areas in which the content has been played, based on IP addresses, domain names, telephone numbers, and the like, which are used for communications by the content play back apparatus 10-1.

The statistics generating means 340 generates statistics of the pirated copy identification information acquired from the play back restricting means 130, the information indicating the date and time of play back of the pirated copy, and the information indicating the areas in which play back has taken place (S770). Specifically, the statistics generating means 340 may generate statistics of the average date and time of initial play back of the pirated copy, or may generate statistics of distribution information classifying the number of the content play back apparatuses 10 which have played the pirated copy, in terms of the area or the date and time. Then, the displaying means 150 shows password identification information to issue a password for removing restriction upon play back imposed by the play back restricting means 130 to a user of the content play back apparatus 10-1 (S780).

On the other hand, when none of identification information included in the playlist is included in the blacklist of the content data (NO in S740), the play back means 140 plays the content (S790). Then, the playlist managing means 110 transmits to the managing apparatus 30 the identification information on the content played by the play back means 140 (S792). Upon receipt of the identification information, the playlist storing means 330 adds the received identification information to the playlist, thereby updating the playlist (S795).

FIG. 8 shows a process for removing restriction upon play back, which is performed by the content play back apparatus 10-1. Upon receipt of the password identification information from the administrator, the encrypting means 360 of the managing apparatus 30 selects a password corresponding to the password identification information from a password DB 370 (S800). Then, the encrypting means 360 encrypts the password (S810), and transmits the encrypted password to the content play back apparatus 10-1 (S820).

The play back restricting means 130 of the content play back apparatus 10-1 decrypts the received password (S830). Then, the play back restricting means 130 determines whether or not the decrypted password is a valid password which is identified by the password identification information displayed by the displaying means 150 (S840). When the password is valid (YES in S850), the play back restricting means 130 removes restriction upon content play back of the play back means 140 (S860).

By the way, conventional techniques such as the issue of a one-time password may be used to perform the process in which the play back restricting means 130 determines the validity of the password by using the password identification information.

As described above, the information processing system 50 according to this embodiment can also restrict subsequent content play back when any of previously played content is a pirated copy. Further, the information processing system 50 can collect information on pirated copies which have been played by each of the content play back apparatuses 10-1 to 10-L, thereby generating statistics information.

Instead of the processing shown in FIGS. 6 to 8, the managing apparatus 30, rather than the content play back apparatus 10-1, may determine whether or not any of identification information included in the playlist is included in the blacklist. More specifically, the managing apparatus 30 compares the blacklist stored in the blacklist storing means 310 to the playlist stored in the playlist storing means 330. When a match occurs at least in part, the managing apparatus 30 can inhibit transmission of content data. In this case, content play back can be restricted more appropriately because the managing apparatus 30 can restrict content distribution in itself, even when the content play back apparatus 10-1 is remodeled.

To remove restriction upon play back imposed by the play back restricting means 130, the user of the content play back apparatus 10-1 must contact the administrator to inform the administrator of displayed password identification information. In this case, the administrator can receive payment of a fee from the user, collect pirated copy information from the user, or ask the user to cooperate in investigating the pirated copies because the administrator can make contact with the user who has played the pirated copy.

A description will be given below with regard to examples in which illegal copying can be prevented effectively by employing the information processing system 50.

APPLICATION EXAMPLE 1

A user A of the content play back apparatus 10-1 buys a pirated game sold on the black market, and inserts the pirated game into the content play back apparatus 10-1 at his or her home. Then, the user A can play the pirated game. After a few days, the user A feels like playing a newly released game and goes to a game shop to buy the game. However, at that time, the content manufacturer or the like has already discovered that the pirated game is widely distributed, and thus, identification information of the pirated game is included in a blacklist in the newly released game. The reason is as follows. A staff member of the game company, who is aware that the pirated game has been sold on the black market, has already bought the pirated game on the black market and investigated the identification information on the pirated game.

The user A, who does not know the fact, tries to play the new game after getting home, but the new game cannot be played by the content play back apparatus 10-1. Depending on the setting of the content play back apparatus 10-1, the user A cannot play all content by using the content play back apparatus 10-1. To remove this restriction, the user A must contact a service center or the like of a distributor of the content play back apparatus 10-1 to ask for repair or the like.

At this time, the service center or the like may take back the played pirated game, because play back of the pirated game causes trouble again.

When the user A contacts the service center or the like, the user A informs the service center or the like of characters displayed on the screen, following instructions from the service center or the like. The characters refer to password identification information displayed by the displaying means 150. An administrator of the service center or the like operates the managing apparatus 30 so as to transmit to the content play back apparatus 10-1 a password which is identified by the password identification information. Thus, the password makes it possible to remove restriction upon play back imposed by the play back restricting means 130 of the content play back apparatus 10-1.

According to the application example 1, the distributor or the like of the content play back apparatus 10-1 can receive payment of a fee or the like from the user, collect information on pirated copies from the user, or ask the user to cooperate in investigating pirated copies, because the distributor or the like can make contact with the user who has played the pirated copy.

APPLICATION EXAMPLE 2

A bona-fide user B of the content play back apparatus 10-2 plays a game Xa by using the content play back apparatus 10-2. As employed herein, X and a denote the name of a game and game identification information, respectively, which are hereinafter represented in the same manner. Then, the user B feels like playing a new game Y and buys a game Yb at the same game shop, where the user B has bought the game Xa. However, when the game Yb is inserted into the content play back apparatus 10-2, the game Xa can be played but the game Yb cannot be played by the content play back apparatus 10-2. When the user B, who has questions about this trouble, inquires at a game company, the user B knows that the game Xa is likely to be a pirated copy and identification information of the game Xa is likely to be included in a blacklist of the game Yb.

The game company manages identification information on all sold games in advance in a manner that those games are associated with distributors which have sold those games. During inquiries from the user B, the game company hears identification information on games which the user B has bought so far and distributors at which the user B has bought those games, and the game company collates such information with game identification information and distributor information. When the game company determines from the result of collation that the user B has not intentionally used the pirated copy, the game company issues a password to remove restriction upon play back of the game Yb. In this case, a staff member of the game company can verbally inform the user B of the password so that the user B enters the password into the content play back apparatus 10-2. Alternatively, the staff member of the game company may operate the managing apparatus 30 so that the password is transmitted from the encrypting means 360 of the managing apparatus 30 to the play back restricting means 130 of the content play back apparatus 10-2.

Then, the game company determines whether the game Xa, which the user B has used, has been legally sold or sold as a pirated copy at the distributor. More specifically, the game company can determine whether or not the distributor has been selling the pirated copy, based on the information provided by the user B. When the game Xa has been sold as a pirated copy, the game company can efficiently investigate the pirated copies or disclose such piracy if the game company determines that a pirated copy maker is likely to have bought other games during the period when legitimate copies of the game Xa have been sold, or in areas where those copies have been sold. Moreover, the game company can investigate the game Yb, because the game Yb sold at the same distributor as the game Xa is also likely to be a pirated copy.

As mentioned above, the information processing system 50 can be used so that the game company or the like can determine that users do not intentionally use pirated copies. In this case, the game company or the like can appropriately remove restriction upon content play back of bona-fide users. Moreover, the game company or the like can identify pirated copy distributors, based on information provided by users.

APPLICATION EXAMPLE 3

A user C of the content play back apparatus 10-3, who has bought a game Xc while knowing that the game Xc is a pirated copy, buys and plays a new game Yd (which may be also a pirated copy). Since identification information of the game Xc is included in a blacklist in the game Yd, the user C cannot use the game Yd. To remove restriction upon play back of the game Yd, the user C must inform the game company or the like of information such as a distributor at which the user C has bought the game Yd.

When the user C informs the game company or the like of the information on the distributor at which the user C has bought the game Yd, the distributor is investigated, thereby making it impossible for the user C to buy pirated games hereafter. Furthermore, the user C must inform the game company or the like of identification information on the game Yd. In this case, the identification information on the game Yd will be included in blacklists in games to be sold hereafter, and thus the user C will be unable to use the games to be sold hereafter. Consequently, the user C must give up playing games using the content play back apparatus 10-3, or must inform the game company of all that the user C knows, and further give up using pirated games.

Even if the user C informs the game company of a different distributor from the distributor at which the user C has actually bought the game Yd, the game company can determine that the user C tells a lie or the game Yd is a pirated copy, because the game company can make sure that the different distributor does not sell the game Yd.

As mentioned above, by using the information processing system 50, the game company or the like can make users, who intentionally have used pirated copies, give up using those pirated copies hereafter. This enables decreasing a demand for pirated copies, thereby preventing distribution of pirated copies.

APPLICATION EXAMPLE 4

A user D, who tries to make a pirated copy, disassembles both the content play back apparatus 10-4 and the recording medium 20, and attempts to analyze what should be recorded in the read only area of the recording medium 20, in order to play pirated copies which have been registered with a blacklist. The assumption is now made that the user D succeeds in analyzing the procedures for determination which the content play back apparatus 10-4 performs to restrict content play back. However, while the user D can acquire a public key (Kp) to decrypt the blacklist and analyze the content play back apparatus 10-4, the user D cannot acquire a secret key (Ks) to encrypt the blacklist. Therefore, the user D cannot forge the blacklist. Even if the user D succeeds in replacing the blacklist of the recording medium 20 with a blacklist of any other recording medium, the tamper prevention data of the recording medium 20 makes it impossible for the user D to remove restriction upon play back.

As described above, the content play back apparatus 10-4 can make it very difficult to make pirated copies.

Figure 9:
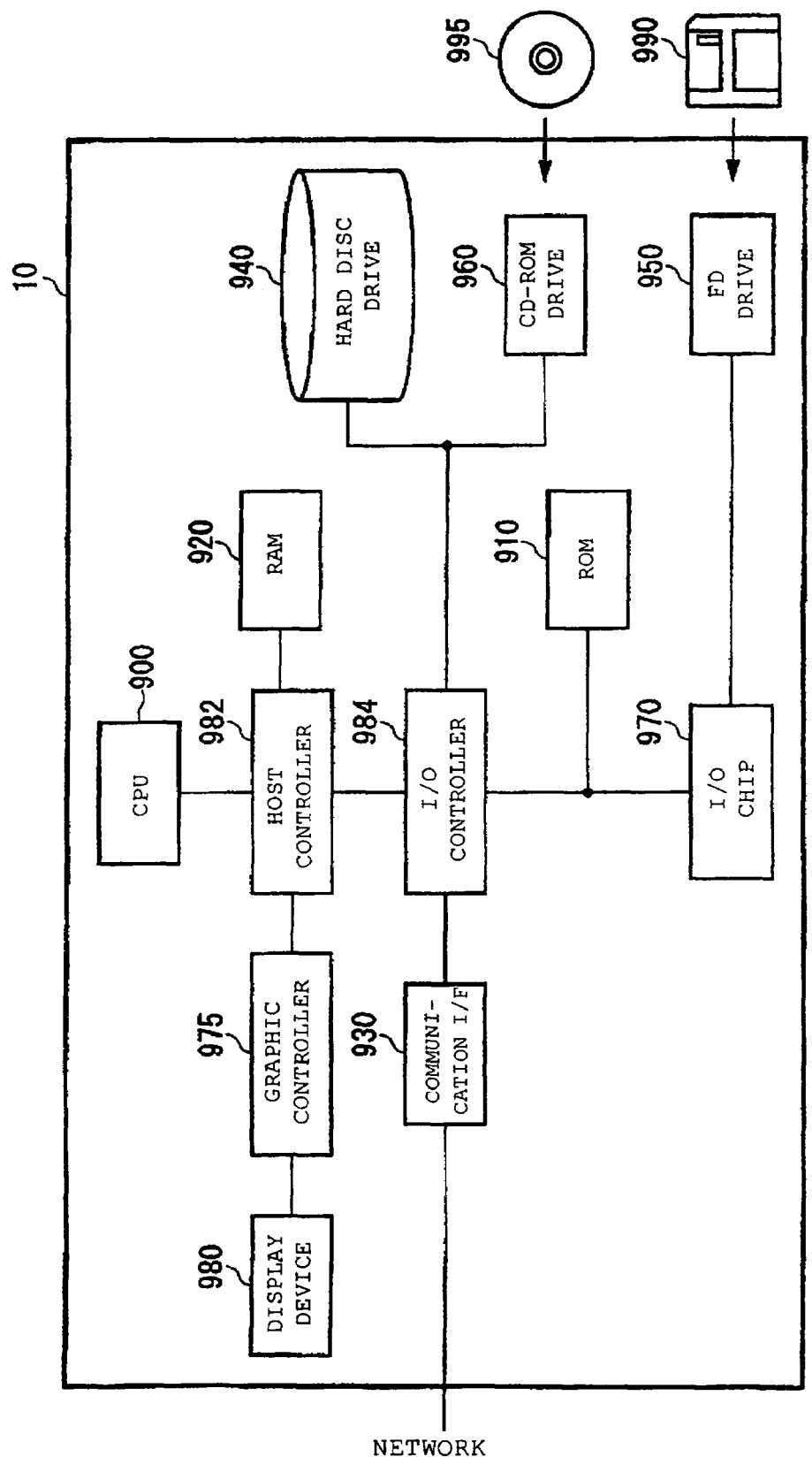
FIG. 9 shows an example of a hardware configuration of the content play back apparatus 10 according to the first or second embodiment of the invention.

FIG. 9 shows one example of hardware configuration of the content play back apparatus 10 according to the first or second embodiment. The content play back apparatus 10 includes a CPU and its peripheral portion, including a CPU 900, a RAM 920, a graphic controller 975, and a display device 980, which are connected to one another via a host controller 982; an input/output portion, including a communication interface 930, a hard disk drive 940, and a CD-ROM drive 960, which are connected to the host controller 982 via an input/output controller 984; and a legacy input/output portion, including a ROM 910, a flexible disk drive 950, and an input/output chip 970, which are connected to the input/output controller 984.

The host controller 982 provides a connection between the RAM 920, and the CPU 900 and graphic controller 975 which access the RAM 920 at a high transfer rate. The CPU 900 operates and controls each of the portions based on programs stored in the ROM 910 and the RAM 920. The graphic controller 975 acquires image data which the CPU 900 or the like generates on frame buffers within the RAM 920, and the image data is displayed on the display device 980 under control of the graphic controller 975. Alternatively, the graphic controller 975 may include frame buffers to store image data generated by the CPU 900 or the like within.

The input/output controller 984 connects the host controller 982 to the communication interface 930, the hard disk drive 940, and the CD-ROM drive 960, which are relatively high-speed input/output devices. The communication interface 930 is connected to an external device via a network. The hard disk drive 940 stores programs and data, which are used by the content play back apparatus 10. The CD-ROM drive 960 reads in a program or data from a CD-ROM 995 and provides the program or data to the input/output chip 970 via the RAM 920.

The ROM 910 and relatively low-speed input/output devices such as the flexible disk drive 950 and the input/output chip 970 are connected to the input/output controller 984. The ROM 910 stores a boot program which the CPU 900 executes at the time of booting of the content play back apparatus 10, a program which depends on the hardware of the content play back apparatus 10, and the like. The flexible disk drive 950 reads in a program or data from a flexible disk 990 and provides the program or-data to the input/output chip 970 via the RAM 920. The input/output chip 970 is connected to the flexible disk 990 and various types of input/output devices, for example, via parallel port, a serial port, a keyboard port, a mouse port, and so on.

A content play back program to be provided to the content play back apparatus 10 is stored in a recording medium such as the flexible disk 990, the CD-ROM 995, or an IC card, and is provided by users. The content play back program is read out from such recording medium and is installed and executed in the content play back apparatus 10 via the input/output chip 970 and/or the input/output controller 984.

The content play back program, which is installed and executed in the content play back apparatus 10, includes a read-in module, a playlist managing module, a blacklist acquiring module, a play back restricting module, a play back module, and a displaying module. In the program, the hard disk drive 940 may function as the playlist managing means 110, or a nonvolatile recording medium (not shown in the drawings) may function as the playlist managing means 110. The operations of those modules acting on the content play back apparatus 10 are the same as the operations of corresponding components of the content play back apparatus 10 described in FIGS. 1 to 8. Accordingly, a description will be omitted with regard to the operations of those modules.

The content play back program may be executed by the managing apparatus 30 after the program is read in by the content play back apparatus 10 and transmitted to the managing apparatus 30. The content play back program executed by the managing apparatus 30 includes a content data transmitting module, a statistics generating module, and an encrypting module. In the content play back program, the hard disk drive of the managing apparatus 30 may function as the blacklist storing means 310, the playlist storing means 330, the statistics DB 350, and the password DB 370. The operations of those modules acting on the managing apparatus 30 are the same as the operations of corresponding components of the managing apparatus 30 described with reference to FIGS. 6 to 8, a description will be omitted with regard to the operations of those modules.

The above-mentioned program may be stored in an external storage medium. Besides the flexible disk 990 and the CD-ROM 995, an optical recording medium such as a DVD or a PD, a magneto-optical recording medium such as an MD, a tape medium, a semiconductor memory such as an IC card, or the like can be used as the storage medium. A storage or memory such as a hard disk or a RAM in a server system connected to a dedicated communication network or the Internet may be also used as the recording medium to provide the program to the content play back apparatus 10 via the network.

Although the invention has been described above with embodiments thereof, the technical scope of the invention is not limited to the scope described in the above-mentioned embodiments. It will be obvious to those skilled in the art that various changes or modifications may be made in the above-mentioned embodiments. It is apparent from the appended claims that the technical scope of the invention may cover embodiments in which such changes or modifications are made.

According to the embodiments or modifications as mentioned above, a content play back apparatus, a play back restricting method, a program executing apparatus, an information processing system, a content play back program, and a recording medium, as given in below items, are implemented.

(Item 1) A content play back apparatus comprising: a play back means for playing content including audio and/or video; a playlist managing means for managing a playlist which is a list of identification information on content previously played by the play back means; a blacklist acquiring means for acquiring a blacklist which is a list of identification information on content illegally copied in the past; and a play back restricting means for restricting content play back of the play back means when any of identification information included in the playlist is included in the blacklist.

(Item 2) A content play back apparatus as defined in Item 1 further comprising a read-in means for reading in content data including the content and the blacklist, wherein the blacklist acquiring means acquires the blacklist read in by the read-in means, wherein the play back restricting means determines whether or not any of identification information included in the playlist is included in the blacklist read in together with the content, and wherein when the play back means plays the content, the playlist managing means adds to the playlist identification information on the content read in by the read-in means.

(Item 3) A content play back apparatus as defined in Item 1, wherein the content and the blacklist are recorded on a recording medium, the play back means plays the content recorded on the recording medium, wherein the playlist managing means stores identification information on the content in a memory or storage within the content play back apparatus each time the content recorded on the recording medium is played, and wherein the blacklist acquiring means acquires the blacklist from the recording medium having the content recorded thereon.

(Item 4) A content play back apparatus as defined in Item 1, wherein when the play back restricting means acquires the identification information on the content and determines that the acquired identification information is not identification information assigned to legitimately copied content, the play back restricting means further restricts play back of the content.

(Item 5) A content play back apparatus as defined in Item 1, wherein the blacklist is encrypted using a cipher whose decipher key is possessed by the content play back apparatus, wherein the blacklist acquiring means further decrypts the acquired blacklist by using the decipher key, and wherein when the blacklist acquiring means fails to decrypt the blacklist, the play back restricting means further restricts content play back of the play back means.

(Item 6) A content play back apparatus as defined in Item 5, wherein the blacklist is encrypted using a secret key of a public key cryptosystem, and wherein the blacklist acquiring means decrypts the blacklist by using a public key corresponding to the secret key.

(Item 7) A content play back apparatus as defined in Item 5, wherein the blacklist is encrypted using any of a plurality of predetermined ciphers, and wherein the blacklist acquiring means decrypts the blacklist by trying to decrypt the blacklist by sequentially using the decipher keys corresponding to the plurality of predetermined ciphers.

(Item 8) A content play back apparatus as defined in Item 1, wherein the blacklist is embedded and recorded as an electronic watermark in the content, and wherein the blacklist acquiring means acquires the blacklist from the electronic watermark embedded in the content.

(Item 9) A content play back apparatus as defined in Item 1 further comprising: a read-in means for reading in content data including the content and the blacklist which are associated with each other, and further reading in tamper prevention data, which is a hash value obtained by hashing the content and the blacklist associated with each other, wherein when a hash value obtained by hashing the content and the blacklist acquired by the read-in means is different from the tamper prevention data, the play back restricting means further restricts play back of the content.

(Item 10) A content play back apparatus as defined in Item 1, wherein the play-back restricting means inhibits the play back means from playing all content when any of identification information included in the playlist is included in the blacklist.

(Item 11) A content play back apparatus as defined in Item 1, wherein the play back restricting means restricts play back of content whose identification information is included in the blacklist and which has been previously played by the play back means.

(Item 12) A content play back apparatus as defined in Item 11, wherein the play back restricting means selects content, which has not passed a predetermined reference time after the time of previous play back of the content by the play back means, among the content whose identification information is included in the blacklist, and the play back restricting means restricts play back of the selected content and permits play back of content which has passed the reference time.

(Item 13) A content play back apparatus as defined in Item 1, wherein the play back restricting means restricts play back of the play back means, in the case that the content whose identification information is included in the blacklist has been previously played by the play back means more times than predetermined.

(Item 14) A content play back apparatus as defined in Item 1, wherein when any of identification information included in the playlist is included in the blacklist, the play back restricting means increases the boot time to boot the content play back apparatus so that the boot time is longer than the boot time which is set when none of identification information included in the playlist is included in the blacklist.

(Item 15) A content play back apparatus as defined in Item 1 further comprising a displaying means for showing users a warning message stating that the content play back apparatus has played illegally copied content, wherein when the content play back apparatus again plays the illegally copied content after the displaying means has displayed the warning message, the play back restricting means restricts play back of the play back means.

(Item 16) A content play back apparatus as defined in Item 1 further comprising a displaying means for showing users password identification information to issue a password for removing restriction upon play back of the play back means imposed by the play back restricting means when any of identification information included in the playlist is included in the blacklist, wherein the play back restricting means removes restriction upon play back of the play back means when a password which an administrator of legitimate content issues based on the password identification information is entered.

(Item 17) A content play back apparatus as defined in Item 1, wherein the play back restricting means further outputs to a managing apparatus, which manages information on illegally copied content, identification information which identifies content that has been previously illegally copied and played by the play back means, in a manner that the identification information is associated with information indicating the date and time of play back of the content or information indicating areas in which the content has been played.

(Item 18) A content play back apparatus as defined in (Item 1), wherein when any of identification information included in the playlist is included in the blacklist, the play back restricting means restricts a process for updating software that allows the content play back apparatus to operate, whereby imposing restriction of content play back upon the play back means.

(Item 19) A program executing apparatus comprising: an executing means for executing a program; a playlist managing means for managing a playlist which is a list of identification information of programs previously executed by the executing means; a blacklist acquiring means for acquiring a blacklist which is a list of identification information on programs illegally copied in the past; and a play back restricting means for restricting program execution of the executing means when any of identification information included in the playlist is included in the blacklist.

(Item 20) An information processing system comprising a content play back apparatus which plays content including audio or video, and a managing apparatus which manages the content play back apparatus, wherein the content play back apparatus includes: a play back means for playing the content; a playlist managing means for managing a playlist which is a list of identification information on content previously played by the play back means; a blacklist acquiring means for acquiring from the managing apparatus a blacklist which is a list of identification information on content illegally copied in the past; and a play back restricting means for restricting content play back of the play back means when any identification information included in the playlist is included in the blacklist, and the managing apparatus comprises a blacklist storing means for storing the blacklist.

(Item 21) A information processing system as defined in Item 20, wherein the managing apparatus further comprises a playlist storing means for storing the playlist associated with the content play back apparatus, and the playlist managing means manages the playlist by sequentially adding identification information on content played by the play back means to the playlist storing means.

(Item 22) A information processing system as defined in Item 20, wherein the play back restricting means further outputs to the managing apparatus, which manages information on illegally copied content, identification information which identifies content that has been previously illegally copied and played by the play back means, in a manner that the identification information is associated with information indicating the date and time of play back of the content or information indicating areas in which the content has been played, and wherein the managing apparatus further comprises a statistics generating means for generating statistics of the identification information, the information indicating the date and time, and the information indicating the areas, which are received from the play back restricting means.

(Item 23) A information processing system as defined in Item 20, wherein the managing apparatus further comprises an encrypting means for encrypting a password for removing restriction upon content play back imposed by the play back restricting means by using a secret key of a public key cryptosystem, and for transmitting the encrypted password to the content play back apparatus, and wherein the play back restricting means decrypts the password received from the encrypting means by using a public key corresponding to the secret key, and removes restriction upon content play back when the decrypted password is valid.

(Item 24) A play back restricting method using a content play back apparatus which plays content including audio and/or video, the play back restricting method comprising: a step of managing a playlist which is a list of identification information on content previously played by the content play back apparatus; a step of acquiring a blacklist which is a list of identification information on content illegally copied in the past; and a step of restricting content play back of the content play back apparatus when any of identification information included in the playlist is included in the blacklist.

(Item 25) A content play back program which allows a computer to function as a content play back apparatus, wherein the computer functions as: a play back means for playing content including audio or video; a playlist managing means for managing a playlist which is a list of identification information on content previously played by the play back means; a blacklist acquiring means for acquiring a blacklist which is a list of identification information on content illegally copied in the past; and a play back restricting means for restricting content play back of the play back means when any of identification information included in the playlist is included in the blacklist.

(Item 26) A recording medium having a content play back program as defined in Item 25 recorded thereon.

As is apparent from the above description, the invention enables effective restriction of play back of illegally copied content. Although embodiments of the present invention has been described in detail, it should be understood that various changes, substitutions and alternations can be made therein without departing from spirit and scope of the inventions as defined by the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention. It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A content play back apparatus comprising:
   play back means for playing content including at least one of audio and video;
   a playlist managing means for managing a playlist which is a list of identification information on content previously played by the play back means;
   a blacklist acquiring means for acquiring a blacklist which is a list of identification information on content illegally copied in the past; and
   a play back restricting means for imposing restriction upon content play back of the play back means when any of identification information included in the playlist is included in the blacklist.

2. A content play back apparatus according to claim 1 further comprising:
   a read-in means for reading in content data including the content and the blacklist,
   wherein the blacklist acquiring means acquires the blacklist read in by the read-in means,
   wherein the play back restricting means determines whether or not any of identification information included in the playlist is included in the blacklist read in together with the content when the play back means plays content, and
   wherein when the play back means plays content, the playlist managing means adds to the playlist identification information on the content read in by the read-in means.

3. A content play back apparatus according to claim 1,
   wherein the content and the blacklist are recorded on a recording medium,
   wherein the play back means plays the content recorded on the recording medium,
   wherein the playlist managing means stores identification information on the content in a memory or storage within the content play back apparatus each time the content recorded on the recording medium is played, and
   wherein the blacklist acquiring means acquires the blacklist from the recording medium having the content recorded thereon.

4. A content play back apparatus according to claim 1,
   wherein the play back restricting means further restricts play back of the content when the play back restricting means acquires the identification information on the content and the acquired identification information is not identification information assigned to legitimately copied content.

5. A content play back apparatus according to claim 1,
   wherein the blacklist is encrypted using a cipher whose decipher key is possessed by the content play back apparatus,
   wherein the blacklist acquiring means further decrypts the acquired blacklist by using the decipher key, and
   wherein when the blacklist acquiring means fails to decrypt the blacklist, the play back restricting means further restricts content play back of the play back means.

6. A content play back apparatus according to claim 5,
   wherein the blacklist is encrypted using a secret key of a public key cryptosystem, and
   wherein the blacklist acquiring means decrypts the blacklist by using a public key corresponding to the secret key.

7. A content play back apparatus according to claim 5,
   wherein the blacklist is encrypted using any of a plurality of predetermined ciphers, and
   wherein the blacklist acquiring means decrypts the blacklist by trying to decrypt the blacklist by using in sequence the decipher keys corresponding to the plurality of predetermined ciphers.

8. A content play back apparatus according to claim 1,
   wherein the blacklist is embedded and recorded as an electronic watermark in the content, and
   wherein the blacklist acquiring means acquires the blacklist from the electronic watermark embedded in the content.

9. A content play back apparatus according to claim 1 further comprising:
   read-in means for reading in content data including the content and the blacklist which are associated with each other, and further reading in tamper prevention data, which is a hash value obtained by hashing the content and the blacklist which are associated with each other,
   wherein when a hash value obtained by hashing the content and the blacklist acquired by the read-in means is different from the tamper prevention data, the play back restricting means further restricts play back of the content.

10. A content play back apparatus according to claim 1,
    wherein the play back restricting means inhibits the play back means from playing all content when any of identification information included in the playlist is included in the blacklist.

11. A content play back apparatus according to claim 1,
    wherein the play back restricting means restricts play back of content whose identification information is included in the blacklist and which has been previously played by the play back means.

12. A content play back apparatus according to claim 11,
    wherein the play back restricting means selects content, which has not passed a predetermined reference time after the time of previous play back of the content by the play back means, from among the content whose identification information is included in the blacklist, and the play back restricting means restricts play back of the selected content and permits play back of content which has passed the reference time.

13. A content play back apparatus according to claim 1,
    wherein the play back restricting means restricts play back of the play back means, in the case that the content whose identification information is included in the blacklist has been previously played by the play back means more times than predetermined.

14. A content play back apparatus according to claim 1,
wherein when any of identification information included in the playlist is included in the blacklist, the play back restricting means increases the boot time to boot the content play back apparatus so that the boot time is longer than the boot time which is set when none of identification information included in the playlist is included in the blacklist.

15. A content play back apparatus according to claim 1 further comprising:
displaying means for showing users a warning message stating that the content play back apparatus has played illegally copied content when any of identification information included in the playlist is included in the blacklist,
wherein the play back restricting means restricts play back of the play back means when the content play back apparatus again plays the illegally copied content after the displaying means displays the warning message.

16. A content play back apparatus according to claim 1 further comprising:
displaying means for showing users password identification information to issue a password for removing restriction upon play back of the play back means imposed by the play back restricting means when any of identification information included in the playlist is included in the blacklist,
wherein the play back restricting means removes restriction upon play back of the play back means when a password which an administrator of legitimate content issues based on the password identification information is entered.

17. A content play back apparatus according to claim 1,
wherein the play back restricting means further outputs to a managing apparatus, which manages information of illegally copied content, identification information which identifies content which has been previously illegally copied and played by the play back means in a manner that the identification information is associated with information indicating the date and time of play back of the content or information indicating areas in which the content has been played.

18. A content play back apparatus according to claim 1,
wherein when any of identification information included in the playlist is included in the blacklist, the play back restricting means restricts a process for updating software that allows the content play back apparatus to operate, whereby restricting content play back of the play back means.

19. A program executing apparatus comprising:
an executing means for executing a program;
playlist managing means for managing a playlist which is a list of identification information of programs previously executed by the executing means;
blacklist acquiring means for acquiring a blacklist which is a list of identification information on programs illegally copied in the past; and
play back restricting means for restricting program execution of the executing means when any of identification information included in the playlist is included in the blacklist.

20. An information processing system comprising a content play back apparatus which plays content of at least one of audio and video, and a managing apparatus which manages the content play back apparatus,
wherein the content play back apparatus comprises:
play back means for playing the content;
playlist managing means for managing a playlist which is a list of identification information on content previously played by the play back means;
blacklist acquiring means for acquiring from the managing apparatus a blacklist which is a list of identification information on content illegally copied in the past; and
play back restricting means for restricting content play back of the play back means when any of identification information included in the playlist is included in the blacklist, and
the managing apparatus comprises a blacklist storing means for storing the blacklist.

21. A information processing system according to claim 20,
wherein the managing apparatus further comprises a playlist storing means for storing the playlist associated with the content play back apparatus, and
the playlist managing means manages the playlist by sequentially adding identification information on content played by the play back means to the playlist storing means.

22. A information processing system according to claim 20,
wherein the play back restricting means further outputs to the managing apparatus, which manages information on illegally copied content, identification information which identifies content which has been previously illegally copied and played by the play back means in a manner that the identification information is associated with information indicating the date and time of play back of the content or information indicating areas in which the content has been played, and
wherein the managing apparatus further comprises a statistics generating means for generating statistics of the identification information, the information indicating the date and time, and the information indicating the areas, which are received from the play back restricting means.

23. A information processing system according to claim 20,
wherein the managing apparatus further comprises an encrypting means for encrypting a password for removing restriction upon content play back imposed by the play back restricting means by using a secret key of a public key cryptosystem, and transmitting the encrypted password to the content play back apparatus, and
wherein the play back restricting means decrypts the password received from the encrypting means by using a public key corresponding to the secret key, and removes restriction upon content play back when the decrypted password is valid.

24. A computer readable medium encoded with a computer program for causing a computer to effect the functions of claim 20.

25. A play back restricting method using a content play back apparatus which plays content of at least one of audio and video, the play back restricting method comprising:
a step of managing a playlist which is a list of identification information of content previously played by the content play back apparatus;
a step of acquiring a blacklist which is a list of identification information of content illegally copied in the past; and a step of restricting content play back of the content play back apparatus when any of identification information included in the playlist is included in the blacklist.

26. A computer readable medium encoded with a computer program for causing a computer to effect the functions of claim 25.

27. A computer readable medium encoded with a computer program which allows a computer to function as a content play back apparatus
wherein the computer functions as:
play back means for playing content including audio or video;
playlist managing means for managing a playlist which is a list of identification information on content previously played by the play back means;
blacklist acquiring means for acquiring a blacklist which is a list of identification information on content illegally copied in the past; and
play back restricting means for restricting content play back of the play back means when any of identification information included in the playlist is included in the blacklist.

* * * * *